(12) United States Patent
Polizotto et al.

(10) Patent No.: US 12,477,310 B2
(45) Date of Patent: Nov. 18, 2025

(54) COMMUNICATIONS SYSTEM HAVING MOBILE WIRELESS DEVICES THAT COMMUNICATE IN PUSH-TO-TALK GROUPS VIA SATELLITE OR AD HOC NETWORK LINK

(71) Applicant: EAGLE TECHNOLOGY, LLC, Melbourne, FL (US)

(72) Inventors: Barton B. Polizotto, Purcellville, VA (US); John M. Davis, Brentwood, TN (US); Sebastian Morana, Haymarket, VA (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 444 days.

(21) Appl. No.: 17/657,139

(22) Filed: Mar. 30, 2022

(65) Prior Publication Data

US 2023/0319512 A1 Oct. 5, 2023

(51) Int. Cl.
*H04W 4/08* (2009.01)
*H04W 4/10* (2009.01)
*H04W 84/06* (2009.01)

(52) U.S. Cl.
CPC ............... *H04W 4/08* (2013.01); *H04W 4/10* (2013.01); *H04W 84/06* (2013.01)

(58) Field of Classification Search
CPC ......... H04W 4/08; H04W 4/10; H04W 84/06; H04W 84/12; H04W 84/18; H04W 88/06; H04W 56/001; H04L 27/2671; H04L 27/2657; H04L 27/2678; H04L 5/0048; H04L 5/0053; H04L 27/2607; H04L 27/2613

USPC .......................................................... 370/329
See application file for complete search history.

(56) References Cited

U.S. PATENT DOCUMENTS

| | | | |
|---|---|---|---|
| 6,763,226 B1 | 7/2004 | McZeal, Jr. | |
| 8,200,223 B2 * | 6/2012 | Harada ................. | H04W 36/02 709/201 |
| 8,255,017 B2 * | 8/2012 | McManus ............. | H04W 88/16 370/401 |
| 8,468,427 B2 * | 6/2013 | Schedelbeck ......... | H04L 1/0083 370/231 |
| 9,154,217 B1 * | 10/2015 | Jain ..................... | H04B 7/18517 |
| 9,693,206 B2 | 6/2017 | Bishop, Jr. et al. | |
| 10,511,337 B2 | 12/2019 | Boghrat et al. | |
| 10,560,815 B2 | 2/2020 | Monnes et al. | |
| 10,630,845 B2 | 4/2020 | Johanning et al. | |
| 10,715,419 B1 * | 7/2020 | Suryanarayana ... | H04L 12/4641 |

(Continued)

*Primary Examiner* — Thuong Nguyen
(74) *Attorney, Agent, or Firm* — ALLEN, DYER, DOPPELT, GILCHRIST, P.A.

(57) ABSTRACT

A satellite communication system may include a constellation of cross-linked orbiting satellites and a network manager that maintains a database of push-to-talk (PTT) groups. A plurality of mobile wireless devices may each include a satellite transceiver and a WiFi transceiver. The mobile wireless device may each also include a controller configured to communicate with other members of a respective PTT group via the satellite transceiver when a satellite link is available, determine at least one ad hoc network link with an adjacent mobile wireless device using the WiFi transceiver, and communicate with the other members of the respective PTT group via the at least one ad hoc network link when the satellite link is not available.

23 Claims, 5 Drawing Sheets

(56) References Cited

U.S. PATENT DOCUMENTS

| | | | |
|---|---|---|---|
| 10,826,994 B1 | 11/2020 | Frigo et al. | |
| 10,827,316 B1 | 11/2020 | Kripp et al. | |
| 10,840,998 B2* | 11/2020 | Lofquist | H04B 7/18517 |
| 11,483,733 B2 | 10/2022 | Lee et al. | |
| 11,855,748 B2* | 12/2023 | Garcia | H02J 50/10 |
| 2002/0018468 A1* | 2/2002 | Nishihara | H04J 14/0246 370/429 |
| 2003/0032426 A1* | 2/2003 | Gilbert | H04B 7/18508 455/430 |
| 2003/0235309 A1* | 12/2003 | Struik | H04L 9/0838 380/278 |
| 2004/0196826 A1* | 10/2004 | Bao | H04L 65/1101 370/465 |
| 2005/0070320 A1* | 3/2005 | Dent | H04W 72/30 455/515 |
| 2006/0003783 A1* | 1/2006 | Fukui | H04W 76/45 455/414.3 |
| 2006/0037072 A1* | 2/2006 | Rao | H04L 47/36 726/14 |
| 2006/0150227 A1* | 7/2006 | Julia | H04N 5/147 725/105 |
| 2007/0274327 A1* | 11/2007 | Kaarela | H04L 67/104 370/401 |
| 2007/0280138 A1* | 12/2007 | Stern | H04W 72/30 370/254 |
| 2007/0286100 A1* | 12/2007 | Saaranen | H04L 67/1068 370/260 |
| 2008/0298238 A1* | 12/2008 | Dawson | H04W 16/14 370/235 |
| 2009/0251295 A1* | 10/2009 | Norair | H04L 67/125 340/10.51 |
| 2009/0303998 A1* | 12/2009 | Rao | H04L 1/1685 370/392 |
| 2009/0310593 A1* | 12/2009 | Sheynblat | H04J 3/0667 370/350 |
| 2010/0309790 A1* | 12/2010 | Polakos | H04L 12/66 370/254 |
| 2011/0065448 A1* | 3/2011 | Song | H04B 7/0632 455/452.2 |
| 2011/0249622 A1* | 10/2011 | Takeda | H04W 48/20 370/328 |
| 2012/0225639 A1* | 9/2012 | Gazdzinski | G07G 1/009 455/414.3 |
| 2013/0121231 A1* | 5/2013 | Kim | H04L 51/58 370/312 |
| 2014/0213214 A1* | 7/2014 | Reis | H04W 4/02 455/404.2 |
| 2015/0103738 A1* | 4/2015 | Venkatraman | G01S 5/0236 370/328 |
| 2016/0150455 A1 | 5/2016 | Suryavanshi | |
| 2016/0205519 A1* | 7/2016 | Patel | G06F 9/45558 455/518 |
| 2016/0291122 A1* | 10/2016 | Amizur | G01S 5/0273 |
| 2016/0316342 A1* | 10/2016 | Narasimhan | H04W 4/029 |
| 2017/0006448 A1 | 1/2017 | Igumnov et al. | |
| 2017/0188227 A1* | 6/2017 | Kang | G01S 5/0252 |
| 2017/0257228 A1 | 9/2017 | Chen | |
| 2017/0292848 A1* | 10/2017 | Nepomuceno | G01C 21/3492 |
| 2017/0302777 A1* | 10/2017 | Harrington | H04B 7/15528 |
| 2017/0367094 A1* | 12/2017 | Albanes | H04L 12/14 |
| 2018/0091243 A1* | 3/2018 | Xu | H04B 17/318 |
| 2018/0255338 A1* | 9/2018 | Ross | H04N 21/44209 |
| 2018/0270899 A1* | 9/2018 | Bishop, Jr. | H04W 76/12 |
| 2018/0375570 A1* | 12/2018 | Lofquist | H04B 7/18517 |
| 2020/0120625 A1* | 4/2020 | Park | H04W 56/001 |
| 2021/0136869 A1* | 5/2021 | Radmand | H04W 84/18 |
| 2021/0176726 A1* | 6/2021 | Vyunova | H04W 64/00 |
| 2022/0030407 A1* | 1/2022 | Bercovici | H04W 48/18 |
| 2022/0311508 A1* | 9/2022 | Kim | H04B 7/18528 |
| 2022/0400532 A1* | 12/2022 | Kalkunte | H04W 72/21 |

\* cited by examiner

COMMUNICATIONS SYSTEM HAVING MOBILE WIRELESS DEVICES THAT COMMUNICATE IN PUSH-TO-TALK GROUPS VIA SATELLITE OR AD HOC NETWORK LINK

FIELD OF THE INVENTION

The present invention relates to the field of satellite communication systems, and, more particularly, to mobile wireless devices that are operable in a push-to-talk (PTT) group via a satellite or WiFi link and related methods.

BACKGROUND OF THE INVENTION

Push-to-talk (PTT) wireless voice communications were employed with military radios in World War II, and today encompass various forms of "walkie-talkie" military, police/fire, commercial, hobbyist, and toy radios. These PTT systems often rely on peer-to-peer radio communication, in which each user transmits directly to all other users via a shared radio spectrum, but limited in range to an individual radio and its transmit power. Some PTT communication systems use trunked radio systems having a control channel that assigns frequency channels to groups of radios and repeaters to increase transmitter power and receiver sensitivity more than a single hand-held unit can achieve, thereby multiplying the reach of the PTT communications network.

More recently, PTT systems have been built on top of the cellular radio network, allowing specialized group communications. This type of PTT system expands the repeaters of trunked radios and relies on multiple, interconnected base stations to extend the communications reach of the power-limited handsets, rather than relying on the very large repeater stations typical of trunked radio installations. For example, the application of Mobile Satellite Services (MSS) systems to PTT group communication builds upon a satellite communications system, such as the Iridium MSS system, to provide voice group communication with global coverage, and provide service in areas that do not have trunked radio or cellular coverage.

Push-to-talk satellite radios, however, often do not function adequately when the radio antenna lacks an unobstructed view of the satellite, such as when the user moves into a building or other obstructed area that blocks a direct view to the satellite signal. A costly repeater can be installed in the building or obstructed area to receive the radio transmission, and then repeat the transmission with another satellite radio that has antenna with a view of the satellite. Even use of these costly repeaters, however, may not allow sufficient connectivity of all satellite radios.

SUMMARY OF THE INVENTION

In general, a satellite communication system may comprise a constellation of cross-linked orbiting satellites and a network manager cooperating with the constellation of cross-linked orbiting satellites and configured to maintain a database of push-to-talk (PTT) groups. A plurality of mobile wireless devices may each comprise a satellite transceiver and a WiFi transceiver. A controller is configured to communicate with other members of a respective PTT group via the satellite transceiver when a satellite link is available, determine at least one ad hoc network link with an adjacent mobile wireless device using the WiFi transceiver, and communicate with the other members of the respective PTT group via the at least one ad hoc network link when the satellite link is not available.

A virtual device is without a satellite transceiver, and the network manager is configured to include the virtual device within the respective PTT group. The virtual device may be configured to communicate via the Internet, and may comprise a virtual wireless device. The network manager may be configured to operate the virtual wireless device in a receive-only mode. The network manager may be configured to pass transmissions therethrough for each PTT group member, and in an example, the network manager may be configured to store for playback at least some of the transmissions.

The constellation of cross-linked orbiting satellites may comprise a plurality of Iridium satellites. At least some of the mobile wireless devices may comprise a hand-held housing carrying the satellite transceiver, WiFi transceiver and controller.

Another aspect is directed to a method of operating a mobile wireless device with a satellite communication system that may comprise a constellation of cross-linked orbiting satellites, and a network manager cooperating with the constellation of cross-linked orbiting satellites and configured to maintain a database of push-to-talk (PTT) groups. The method includes operating a controller of the mobile wireless device to communicate with other members of a respective PTT group via a satellite transceiver of the mobile wireless device when a satellite link is available, determine at least one ad hoc network link with an adjacent mobile wireless device using a WiFi transceiver of the mobile wireless device, and communicate with the other members of the respective PTT group via the at least one ad hoc network link when the satellite link is not available.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION

The present description is made with reference to the accompanying drawings, in which exemplary embodiments are shown. However, many different embodiments may be used, and thus, the description should not be construed as limited to the particular embodiments set forth herein.

Rather, these embodiments are provided so that this disclosure will be thorough and complete. Like numbers refer to like elements throughout.

Figure 1:
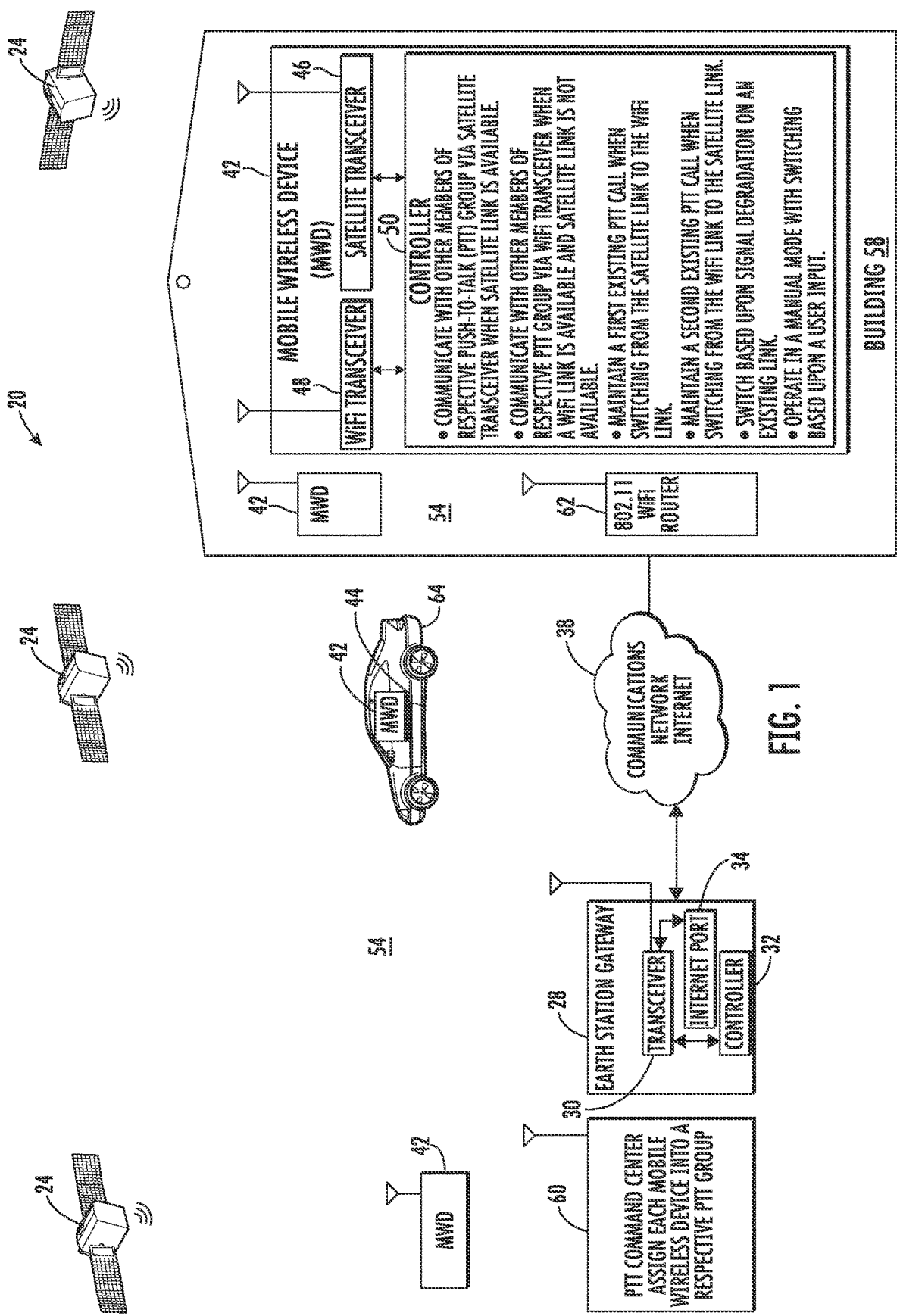
FIG. 1 is a block diagram of the satellite communication system showing the earth station gateway and plurality of mobile wireless devices that communicate in a push-to-talk group via a satellite or WiFi link in accordance with a non-limiting example.

Referring to FIG. 1, a satellite communication system is illustrated generally at 20 and includes a constellation of cross-linked orbiting satellites 24. In an example, the constellation of cross-linked orbiting satellites 24 may be arranged in a plurality of polar orbital planes and may be a plurality of Iridium satellites. The satellites 24 are not limited to Iridium satellites, but may be different satellites not only in low earth orbit as with Iridium satellites, but the satellites may be in different geostationary or non-geostationary orbits providing cross-linked communications with each other and with earth ground stations.

An earth station gateway 28 communicates with the constellation of cross-linked orbiting satellites 24. In an example, the earth station gateway 28 is an Iridium earth station gateway and includes an earth gateway transceiver 30 and controller 32 connected thereto and an Internet port 34 to communicate with other devices via a communications network 38, such as the Internet. The controller 32 is operatively connected to the earth gateway transceiver 30 and controls the transceiver and communications such as with the different cross-linked orbiting satellites 24 and via the Internet port 34 and may communicate with other devices that connect to the Internet and communications network 38.

Besides L-band Iridium satellite communications, the satellite communication system 20 may operate in other satellite communication bands, including C-band (4-8 GHz), X-band (8-12 GHz), Ku-band (12-18 GHz), Ka-band (26-40 GHz), and other satellite bands. The cross-linked orbiting satellites 24 may be in a geocentric orbit (LEO, MEO, HEO), geostationary (GEO) orbit, polar orbit, sun-synchronous orbit (SS-), transfer orbits, and geostationary transfer orbit (GTO).

As illustrated, the satellite communication system 20 includes a plurality of mobile wireless devices 42, such as a hand-held, mobile wireless communications device configured for satellite communication with the plurality of orbiting satellites 24. Each mobile wireless device 42 includes a satellite transceiver 46 configured to communicate with the constellation of cross-linked orbiting satellites 24, and a WiFi transceiver 48 configured to communicate with another WiFi transceiver, which, in turn, may communicate with the Internet port 34 of the earth station gateway 28.

Each mobile wireless device 42 includes a controller 50 operatively connected to the respective satellite transceiver 46 and WiFi transceiver 48 and configured to communicate with other members of a respective push-to-talk (PTT) group that is illustrated generally at 54 via the satellite transceiver when a satellite link is available.

The controller 50 is also configured to communicate with the other members of the respective push-to-talk (PTT) group 54 via the WiFi transceiver 48 when a WiFi link is available and the satellite link is not available. The controller 50 is also configured to maintain a first existing PTT call for the respective mobile wireless device 42 when switching from the satellite link to the WiFi link as when the user of the mobile wireless device enters a building 58 that has an obstructed view of the satellite 24. The controller 32 also maintains a second existing PTT call when switching from the WiFi link to the satellite link as when leaving the building 58 where there was an obstructed view of the satellite 24 and moving into an open area having an unobstructed view of the satellite.

A PTT command center device 60 may assign each of the mobile wireless devices 42 into a respective PTT group, such as the illustrated PTT group 54. Some of the mobile wireless communications devices 42 may be formed as hand-held or other portable satellite mobile wireless communication devices, such as the illustrated mobile wireless device 42 shown in greater detail in FIG. 3, which includes a hand-held housing. The mobile wireless device 42 may communicate with another WiFi transceiver 62 in the building 58, for example, a stationary 802.11 router as part of a building WiFi network, which connects to the Internet and the communications network 38, or connects to another mobile wireless device 42 located in the building 58 or just outside the building that, in turn, connects via its WiFi transceiver 48 to the communications network 38 and Internet. The WiFi transceiver 62 located in the building 58, or another mobile wireless device 42 within the building as illustrated, connects to the Internet and to the earth station gateway 28 via its Internet port 34. At least some of the mobile wireless devices 42 may include a vehicle-mount housing 44 so that a user located in an automobile, truck, ship, or other transport vessel, may operate the mobile wireless device 42 and its satellite transceiver 46, WiFi transceiver 48 and controller 50 while traveling as shown in the example of the mobile wireless device 42 contained in a vehicle illustrated at 64.

The controller 50 at a mobile wireless device 42 may be configured to switch operation between the satellite transceiver 46 and WiFi transceiver 48 based upon signal degradation of an existing link, such as when the satellite link weakens when a user operating the mobile wireless device enters the building 58. The controller 50 is also operable in a manual mode by switching between the satellite transceiver 46 and WiFi transceiver 48 based upon a user input via a button or touch display, such as the display 80 or keypad and data entry 78 shown on the mobile wireless device 42 in FIG. 3. For example, the illustrated mobile wireless device 42 in FIGS. 1 and 3 could be communicating with other members of a respective PTT group 54 via the satellite transceiver 46 when the user is located outside the building 58 and a satellite link is available. When the user operating the mobile wireless device 42 initially enters the building 58 where the satellite link is weakened, the existing satellite link experiences a signal degradation and the controller 50 determines that the satellite link cannot be maintained and switches to the WiFi transceiver 48 when the WiFi link is available. If the WiFi link is secure, the user may use a keypad and data entry or touch display to enter the password for the WiFi network or if public, possibly automatically join. The mobile wireless device 42 may communicate with the other WiFi transceiver 62, such as the 802.11 router located in the building 58 or another mobile wireless device 42 in the building, or just outside the building that is operating with its WiFi transceiver 48 and has WiFi capability, and thus, connect to the Internet via the communications network 38, and in turn, to the earth station gateway 28, and thus, other mobile wireless devices 42 as part of the push-to-talk group 54, as shown in FIG. 1.

Additionally, as noted before, the controller 50 of the mobile wireless device 42 may be operable in a manual mode where the user may determine the satellite signal is fading, such as when entering the building 58 or an area where satellite coverage is weak, such as overhangs at a gas station or rarely excessive tree foliage, and switch to the WiFi transceiver 48 if it is available by pressing a button on the keypad and data entry or touching a human interface, such as on a display.

Figure 2:
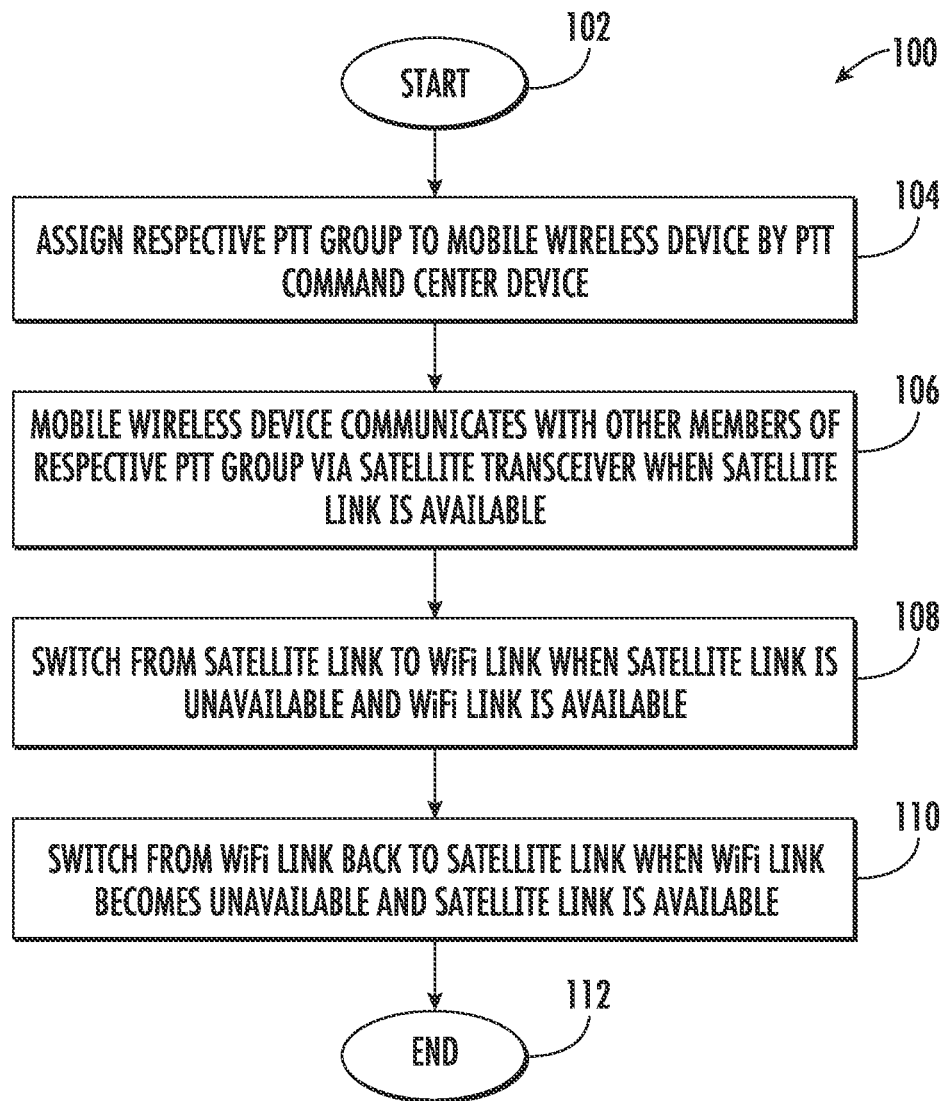
FIG. 2 is a high-level flowchart of a method for operating a mobile wireless device with the satellite communication system of FIG. 1.

Referring now to FIG. 2, there is illustrated a flowchart for showing a sequence of steps that may be used for operating the satellite communication system 20 as illustrated in FIG. 1, with a method indicated generally at 100. The process starts (Block 102) and a respective PTT group 54 for mobile wireless devices 42 is assigned by a PTT command center device 60 (Block 104). A specific mobile wireless device 42 that is assigned to the PTT group 54 has its controller 50 configured to communicate with other members of a respective PTT group, such as via the satellite transceiver 46 when the satellite link is available (Block 106). The respective members of the PTT group 54 can be assigned by a unique identification code stored in a memory of each mobile wireless device 42. When the satellite link is unavailable and signal degradation occurs, the controller 50 that is maintaining a first existing PTT call may switch from the satellite link to the WiFi link if it is available (Block 108). When the satellite link is again available, such as when the mobile wireless device 42 exits the building 58, a second existing PTT call is maintained when switching from the WiFi link to the satellite link during a handover process (Block 110). The second PTT call may be a continuation of the first PTT call, for example. The process ends (Block 112).

The satellite communication system 20 provides connectivity for each of the different mobile wireless devices 42 as satellite radio devices whether the antenna for that device has a view to the satellite 24 or not. A mobile wireless device 42 located in the illustrated building 58 (FIG. 1) may connect to the earth station gateway 28 via its WiFi transceiver 48 that connects to the WiFi transceiver 62, such as the illustrated 802.11 router. A user operating the mobile wireless device 42 may have maintained a first existing PTT call when switching from the satellite link to the WiFi link and may walk outside the building 58 and maintain a second push-to-talk call by switching to its satellite transceiver 46. The satellite communication system 20 provides an automatic seamless switching capability such that mobile wireless devices 42 with the push-to-talk capability may maintain a call when entering or leaving an area having an obstructed view of a satellite 24 by switching back-and-forth between the satellite transceiver 46 and a WiFi connection using the WiFi transceiver 48.

Each mobile wireless device 42 may include an accessory device (not shown), such as a wireless audio input/output device coupled to the controller 50. The accessory device may be ancillary to a speaker and microphone on the device 42, and an accessory audio input/output device may operate as an ancillary microphone and speaker. In a non-limiting example, to initiate a push-to-talk mode, a mobile wireless device 42 may include a button that is depressed or a separate push-to-talk microphone/speaker accessory that could be wired in an example to the respective mobile wireless device and could be attached on clothing, such as a collar, shoulder piece or helmet. An example are emergency first responders that may wear protective clothing and wear the push-to-talk microphone/speaker accessory near the shoulder or breast.

The PTT command center device 60 may assign different mobile wireless devices 42 to different subgroups and change the subgroups depending on exigencies or emergency situations that arise. The PTT command center device 60 may transmit commands to a specific mobile wireless device 42 based upon a unique identification code for the given mobile wireless device that may be stored in a memory associated with the controller 50. Different encryption standards may be used and it is possible to use voice over IP 802.11 standard library waveforms since there is a WiFi connection using the WiFi transceiver 48 in each mobile wireless device 42 to support bridging of audio calls. Each mobile wireless device 42 may integrate the capability to operate in a satellite link and have direct connection to the satellite link via the earth station gateway 28, and thus, to a satellite 24 using WiFi and the Internet 38. The satellite communication system 20 does not require additional antennas, equipment or cabling and provides automatic seamless switching capability so that the push-to-talk mobile wireless devices 42 can maintain a call when entering or leaving a building that obstructed the view of the satellite 24.

The satellite communication system 20 overcomes the disadvantages associated with using Iridium repeaters or other satellite repeaters. A user of the mobile wireless device 42 as a satellite radio with push-to-talk capability does not have to carry another line-of-sight radio to be able to employ push-to-talk calls in areas that obstruct the antenna signal of the device to the satellite, such as a building 58.

Figure 3:
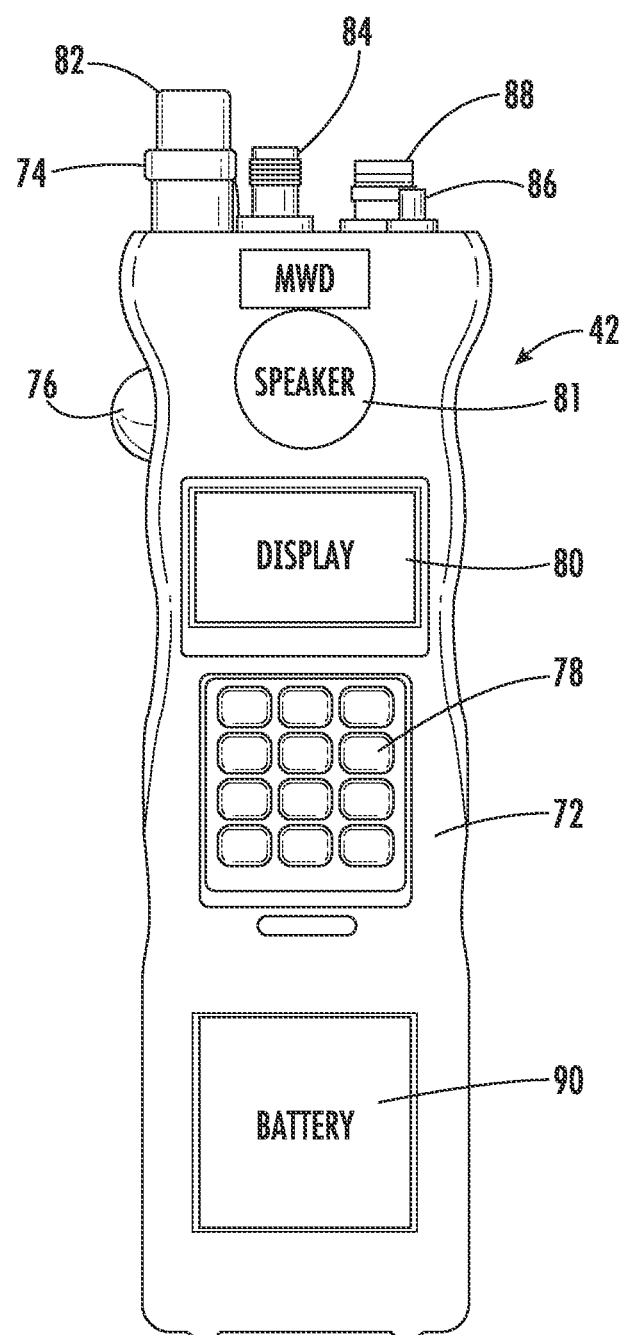
FIG. 3 is a schematic diagram of an example push-to-talk mobile wireless device that may be used with the satellite communication system of FIG. 1.

An example mobile wireless device 42 that may be modified to work with the satellite communication system 20 is a multi-channel, hand-held radio transceiver as shown in FIG. 3 that may incorporate not only the satellite transceiver 46, but also the WiFi transceiver 48 (FIG. 1). An example of such mobile wireless device 42 is the RO-X radio transceiver manufactured by L3Harris Technologies, Inc.

The mobile wireless device 42 in this example is a hand-held radio that also includes transceiver functionality to operate as a cellular communications device, such as via GSM, and as a satellite radio using the satellite transceiver 46 and the satellite communication system as part of the constellation of cross-linked orbiting satellites 24 shown in FIG. 1. The mobile wireless device 42 includes not only the satellite transceiver 46, but also its WiFi transceiver 48 and associated controller 50 and may operate in a push-to-talk (PTT) mode with one-to-many communications, and may include integrated messaging.

As shown in the example of FIG. 3, the mobile wireless device 42 includes a housing 72 having a channel selector knob 74 at the top of the housing for selecting the different channels that each operate as a push-to-talk group, a push-to-talk button 76 at the side of the housing, a keyboard 78 on the front of the housing, and a display 80 and speaker 81 on the front. The top section of the housing 72 supports not only the channel selector knob 74, but also a volume control knob 82, an antenna connector 84 for a satellite antenna, and an SMA connector 86 for a WiFi antenna. An ADF connector 88 may operate as a cloud-based data integrator and connector. A battery 90 is removably connected at the bottom of the housing 72.

In an example, the mobile wireless device 42 may operate at a frequency range from 1616.5 to 1626.5 MHz (L-band) and at 1575 MHz for GPS reception. Channel spacing for bandwidth may vary, but in an example may be about 41.667 KHz. Programmable presets allow a user to select 15 different channels as push-to-talk groups 54 so that different "nets" or push-to-talk groups may be configured and selected. Different encryption algorithms may be used, including AES, as validated by FIPS 140-3 level 2. A transmitter/receiver module for the satellite transceiver 46 may have an output of up to 38 dBm and a sensitivity of −119 dBm, with adjacent channel rejection of about −33 dBc. The satellite/GPS antenna port 84 may also be used for GPS and incorporate a conventional 50-ohm TMC connector. The WiFi antenna port 86 may include an SMA connector. The mobile wireless device 42 may also incorporate a USB interface.

The mobile wireless device 42 operates in an example as an overlay to the Iridium communications system such as the Distributed Tactical Communications System (DTCS) that permits operation of different channels as push-to-talk groups 54. The mobile wireless device 42 permits on-the-move (OTM), over-the-horizon (OTH) secure voice, data and position location information (PLI). The mobile wireless device 42 may be a registered member of up to 15 different "nets" or push-to-talk groups 54. Voice, data and GPS may be transmitted and received over a single satellite antenna connected to the mobile wireless device 42 via its antenna connector 84.

It is possible to incorporate a non-satellite device such as an Android mobile wireless device as a wireless speaker and microphone via use of an android application stored within the mobile wireless device 42. The mobile wireless device 42 may operate with Short Burst Data (SBD) as part of the communications system and an associated Earth station gateway 28 (FIG. 1) where a "ring alert" may be sent to the satellite transceiver 46 when a mobile terminated SBD (MT-SBD) message has been queued at the gateway. The mobile wireless device 42 operates with the constellation of cross-linked orbiting satellites 24, which in the example of the satellites transmit in the L-band at carrier frequencies in the range of 1616 to 1626.5 MHz using quadrature phase shift keying (QPSK) and a symbol rate of 25,000 symbols per second. Transmissions may be frame based with a frame length of about 90 milliseconds (ms).

In the example of the use of the satellites 24, these satellites may travel at speeds of about 7,500 meters per second, which results in variations of up to +/−40 KHz from the nominal carrier frequency due to the Doppler effect. Compared to GNSS signals, the satellite 24 signals may have a much higher raw signal power of 300 to 2,400 times as seen by a receiver such as the mobile wireless device 42 on Earth. Each satellite 24 may use a frequency division multiple access/time division multiple access (FDMA/TDMA) scheme for communication with other satellites using differentially encoded QPSK modulation at 2,400 bits per second. Subscriber links may be in the L-band, and in an example, about 1616 and 1626.5 MHz. Feeder links may be in the Ka band without downlinks between about 19.4 and 19.6 GHz, and uplinks between about 29.1 to 29.3 GHz with inter-satellite links of about 23.18 and 23.3 GHz and 25 Mbps. Each satellite 24 may provide 48 individual spot beams with a frequency re-use pattern for a total of 1628 cells, with each cell covering about a 30 mile footprint.

Figure 4:
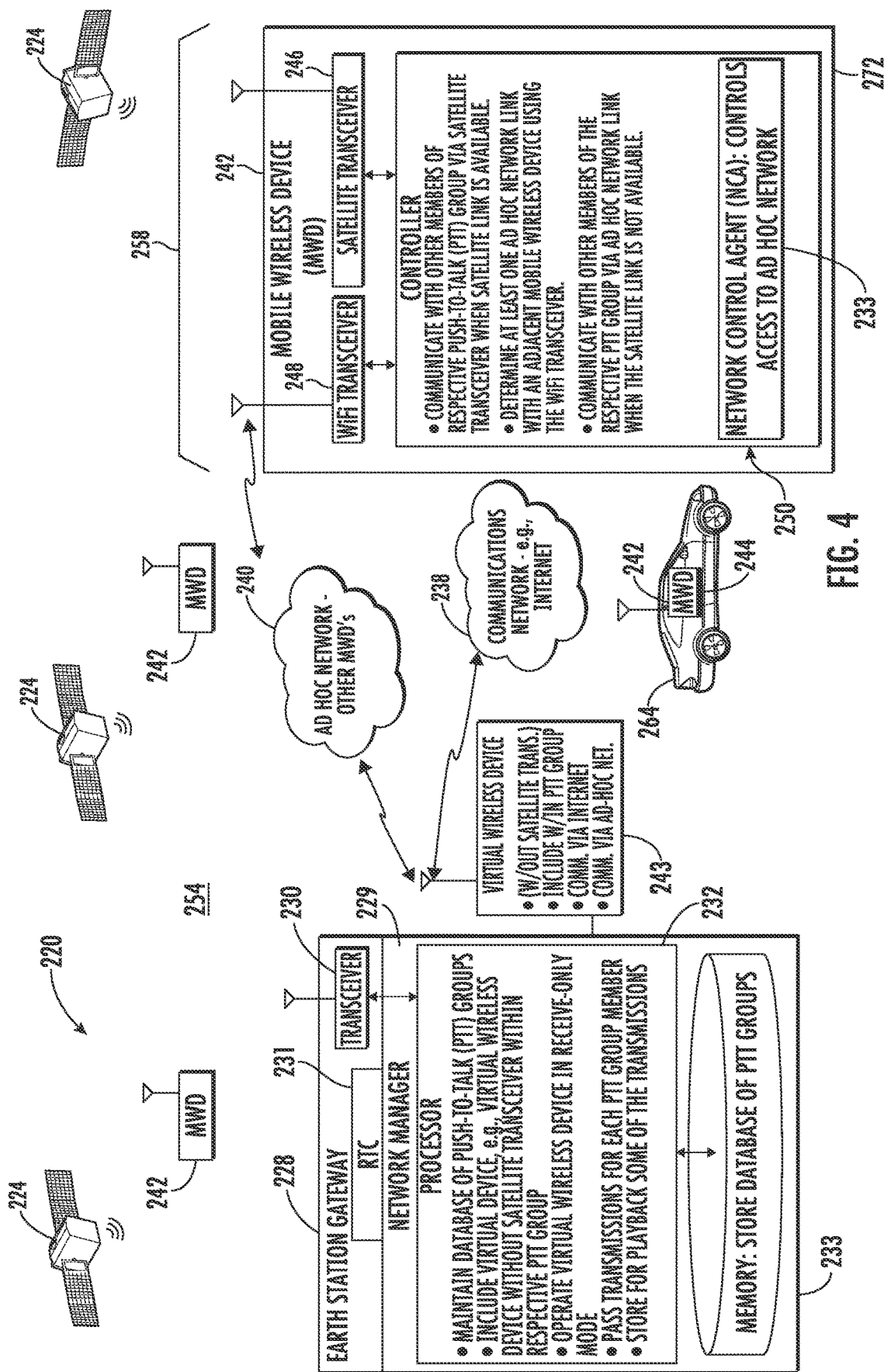
FIG. 4 is a block diagram of another example of the satellite communication system similar to that shown in FIG. 1, but using a network manager, an ad hoc network, and virtual devices.

Referring now to FIG. 4, there is illustrated another example of a satellite communication system 220 similar to that satellite communication system 20 shown in FIG. 1, but which includes a network manager 229 associated with the Earth station gateway 228. With the description of the satellite communications system 220 in FIG. 4, reference numerals begin in the 200 series, and any common components shown in the satellite communication system 20 of FIG. 1 are given similar reference numerals but in the 200 series.

The satellite communication system 220 includes a constellation of cross-linked orbiting satellites and the network manager 229 at the gateway 228 cooperates with the constellation of cross-linked orbiting satellites 224 and includes a processor 232 similar in function to the controller 32 in FIG. 1, and configured to maintain in a memory 233 a database of push-to-talk (PTT) groups 254. The network manager 229 communicates with the satellites 224 via the transceiver 230 similar in function to the transceiver 30 of FIG. 1.

A plurality of mobile wireless devices 242 are illustrated and each mobile wireless device includes a satellite transceiver 246, a WiFi transceiver 248, and a controller 250 that is configured to communicate with other mobile wireless devices of a respective PTT group 254 via the satellite transceiver 246 when a satellite link is available. The controller 250 also determines at least one ad hoc network link with an adjacent mobile wireless device using the WiFi transceiver 248 to communicate therewith via an ad hoc network 240 in this example. For example, the mobile wireless device 242 communicates to other mobile wireless devices that form the ad hoc network 240. The controller 250 is configured to communicate with the other members of the respective PTT group 254 via the at least one ad hoc network link 240 when the satellite link is not available, such as shown by the mobile wireless device 242 positioned in a building shown schematically by the roofline 258.

The processor 232 in the network manager 229 is configured to maintain the database of different PTT groups 254 within the memory 233. As illustrated, a virtual device 243 is formed as a virtual wireless device and has no satellite transceiver. The network manager 229 is configured to include the virtual device 243 within a respective PTT group 254. For example, the virtual wireless device 243 could be a conventional android or similar phone that has no satellite transceiver, but may connect using a WiFi transceiver with the ad hoc network 240. The virtual device 243 may be configured to communicate with other devices or different networks via a communications network such as the internet 238. When the virtual device 243 is a virtual wireless device, it may be configured to operate in a receive-only mode with other mobile wireless devices 242 connected to the ad hoc network 240 or internet 238.

A mobile wireless device 242 may include a hand-held housing 272 carrying the satellite transceiver 246, WiFi transceiver 248 and controller 250. The constellation of cross-linked orbiting satellites 224 in this example are formed as a plurality of satellites similar to the satellite communication system 20 of FIG. 1. In this example, the network manager 229 may be configured to pass transmissions therethrough for each mobile wireless device 242 in a PTT group 254 and configured to store or play back at least some of the transmissions. At least some of the mobile wireless devices 242 may include a vehicle-mount housing 244 so that a user located in an automobile, truck, ship or other transport vehicle may operate in a vehicle illustrated at 264.

In the example shown in the satellite communication system 220 of FIG. 3, the right-hand side mobile wireless device 242 does not have "blue sky" reception since it is located in a structure 258 or covered, indicative that it may not operate its satellite transceiver 246 and will communicate with other mobile wireless devices via the ad hoc network 240. One of the mobile wireless devices 242 may act as a proxy such as for the virtual wireless device 243, and that proxy mobile wireless device would, in turn, communicate with the satellite 224 and back to the network manager 229. Transmissions from the virtual device 243 or a mobile wireless device 242 that has no satellite communications because of satellite 224 signal block may be transmitted back to a satellite, which in turn, would transmit the communications data from the satellite to another mobile wireless device 242 or to an Earth station gateway 228, which could forward the message to another mobile wireless device or other recipient.

Figure 5:
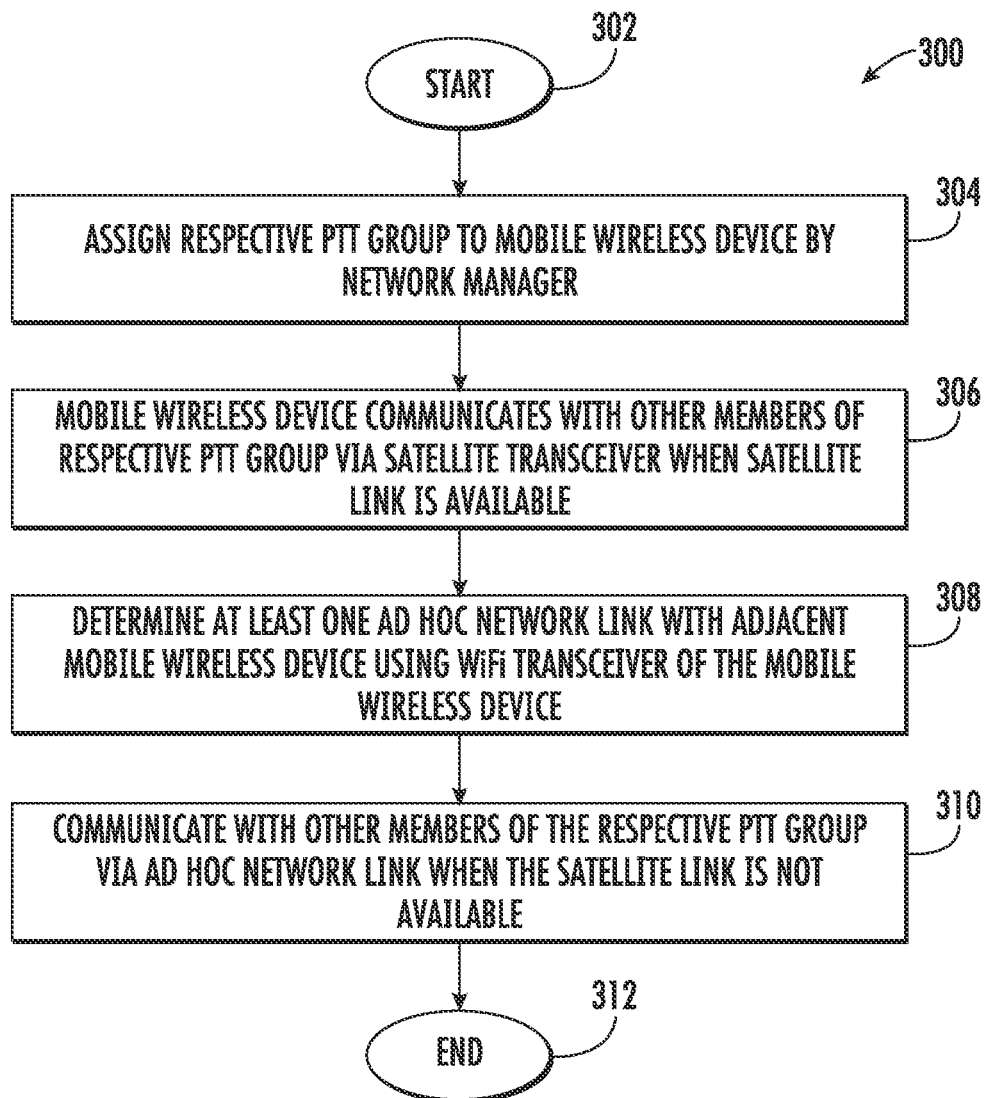
FIG. 5 is a high-level flowchart of a method for operating a mobile wireless device with the satellite communication system of FIG. 4.

Referring now to FIG. 5, there is illustrated a flowchart showing a sequence of steps that may be used for operating the mobile wireless device 242 with the satellite communication system 220 as illustrated in FIG. 4, with the method indicated generally at 300. The process starts (Block 302) and a respective PTT group 254 for mobile wireless devices 242 is assigned by the network manager 229 (Block 304). A specific mobile wireless device 242 that is assigned to the PTT group 254 has its controller 250 configured to communicate with other members of a respective PTT group via the satellite transceiver 246 when the satellite link is available (Block 306). The controller 250 at the mobile wireless device 242 determines at least one ad hoc network 240 link with adjacent mobile wireless devices using the WiFi transceiver 248 of the mobile wireless device (Block 308). The mobile wireless device 242 communicates with other members of the respective PTT group 254 via the ad hoc network 240 link when the satellite link is not available (Block 310). The process ends (Block 312).

Referring again more particularly to the satellite communication system 220 of FIG. 4, push-to-talk mobile wireless devices 242 do not function with satellite communications when its satellite radio antenna has an obstructed view of the satellite 224. In operation, the normal voice operation payload includes an analog microphone signal that is converted to a digitized voice signal, and conversely, a received digital signal is converted to an analog signal that is output to the speaker 81 (FIG. 3) or other earphone accessory.

This signal is transmitted in small, e.g., about 240 bit units per 90 ms, from the controller 250 operating as a radio application processor to the device modem (not shown), where it is encrypted and enveloped into an Iridium frame for transmission via the satellite transceiver 246 to an acquired satellite 224. The reverse data flow sequence occurs when receiving a signal.

Unlike an unmanaged radio network that broadcasts to communication devices over an RF line-of-sight, the mobile wireless device 242 sits atop a managed satellite communications system and may employ, in this example, the Distributed Tactical Communications System (DTCS) protocol, which defines the concept of a DTCS "Net" as a push-to-talk group 254. The "Net" or push-to-talk (PTT) group 254 is a logical grouping of radios as mobile wireless devices 242 on a satellite channel. Nets as PTT groups 254 are maintained by the network manager 229, which may operate as a computer platform hosted at the Earth station gateway 228. Any radio participating in a PTT group 254 may be registered with the network manager 229, which provisions each mobile wireless device 242 with PTT configurations, including network encryption keys. In normal operation, the mobile wireless device 242 performs an "enrollment" process via its controller 250, and attaches at power-up to register with the network manager 229. Data is received for configuration and includes data about radio configuration, positioning parameters, and the assigned nets as PTT groups 254. This data may also include net unique key material, such as an encryption key pair, nonce, and initialization vector information from the network management enrollment database (eDB), the memory 233 having the database of PTT groups 254. The processor 232 that operates with the memory 233 having the eDB includes a configuration mechanism that operates as a store and forward "mailbox" system and holds the different configuration elements for the mobile wireless devices 242 in discrete locations. Each eDB or database entry in memory 233 may be indexed by an International Mobile Equipment Identity (IMEI), which the processor 232 then substitutes with a temporary mobile subscriber identity (TMSI), used as the source identifier for that registration period for a mobile wireless device 242. The registration elements (including TMSI value) are changed/updated periodically (nominally, every 24 hours).

A communications agent is associated with the network manager 229 at the Earth station gateway 228 to retransmit sender "Net" as PTT group 254 traffic to the other mobile wireless devices 242 within a Net as a PTT group. This communications agent may be a software or hardware module and operate as a retransmission controller (RTC) 231, and may also be an independent network component or a component integral with the network manager 229 at the gateway 228. This RTC 231 interacts with the network manager 229 that maintains the location and other essential device information for mobile wireless devices 242.

Each mobile wireless device 242 may initiate a "Net" or PTT control request via a physical or logical push-to-talk (PTT) action, which sends a digital request to the RTC 231 as a communications agent and associated with the network manager 229 via the satellite 224. The RTC 231 arbitrates, and, if the defined Net or PTT group 254 is not in use, grants a token for transmission with a response message sent through the satellite 224 back to the mobile wireless device 242 as an end device. The mobile wireless device 242 operating as an end device then alerts the user of the other mobile wireless device that a send channel is available and streams the audio input while the PTT button on its mobile wireless device is depressed. Upon receipt of the communications frame, the RTC 231 as a communications agent associated with the network manager 229 matches the destination Net or PTT group 254 to a set of mobile wireless devices 232 as members of that PTT group listed in the database in the network manager and their respective servicing satellites 224. It then sends the communications signal back out (reflects) to the satellites 224 that have the "Net" or PTT group 254 mobile wireless devices 242 in their beam footprint. The satellites 224 then forward the signal to the Net or PTT group 254 recipients.

The satellite communications system 220 may operate in a push-to-talk (SPTT) mode that in an example appears "seamless" to a user. In previous satellite systems, the mobile wireless devices 242 had to have "blue sky" satellite 224 access to communicate, but employment of the WiFi transceiver 248 and ad hoc network 240 in this example allows the alternate path to interoperate. A mobile wireless device 242 may send and receive communications traffic via the ad hoc network 240. A peer node as another mobile wireless device may operate as a gateway device in the ad hoc network and forward traffic to and from the RTC 231 and network manager 229 at the gateway 228 and within the respective PTT group 254.

This enhances the communications capability of the satellite communications system 220 with mesh networking in the ad hoc network 240 as an alternate control and communications data path using WiFi or UDP/IP. To operate with the ad hoc network 240, each mobile wireless device 242 includes a network connection agent (NCA) 233, such as firmware or software operating as part of the controller 240 at each mobile wireless device and with an associated API sequence of commands.

In an example, the mobile wireless devices 242 may be preconfigured or manually configured to communicate via the ad hoc network 240 link using an integrated traditional WiFi (wlan0) connection or an Ethernet (eth0) connection and assigned IP addresses, and a usergram data protocol (UDP) as the datagram backbone for control and data messages as will be described below. It is possible to operate the ad hoc network 240 as a MANET (mobile ad hoc network) that provides self-routing endpoint connectivity with efficient payload encapsulation, Layer 2 addressing, and optional encryption. The ad hoc network 240 may be self-discovering and mobile wireless devices 242 may be continuously connected and provide an underlying path for sending and receiving communication payloads between endpoints and peer mobile wireless devices within a PTT group 254 as gateway proxies for subsequent Iridium connectivity.

The network control agent 233 may be associated with a controller 250 at each mobile wireless device 242 and may include a status monitoring module that monitors satellite connectivity from, for example, a modem as part of the user equipment (UE) for the satellite transceiver 246 and generate associated status messages as to satellite connectivity. When the satellite 224 communications link is positive, the mobile wireless device 242 data path works in the traditional manner. When the controller 250 and its network control agent 233 detect the satellite link is negative, any user interface control messages and encoded payload communications traffic are redirected to an alternate path via the ad hoc network 240. The alternate communications path may be established over an always-connected, multicast and encrypted, WiFi MANET as an example of the ad hoc network 240 and managed by the network control agent 233 at the controller 250 and hosted via a bat0 network interface.

The controller 250 and its network control agent 233 for each mobile wireless device 242 that has a positive satellite link, on the other hand, will advertise itself as a positive link. Each mobile wireless device 242 constantly uses routing information from an ad hoc network stack as part of its network control agent 233 at its controller 250 to identify and update its least cost calculation to use a particular mobile wireless device gateway, if needed, and as a proxy for that other sender's mobile wireless device's session.

An enrollment sequence into the ad hoc network 240 for a mobile wireless device 242 as either sender or receiver may be initialized or updated via a mobile wireless device 242 operating as a servicing gateway in the ad hoc network and dynamically maps data within the network control agent 233 and controller 250. When registration is triggered, the controller 250 sends an "enrollment request," which includes a virtual equipment identifier, such as VEI or a TMSI on subsequent reregistration, that is linked to the unique IMEI database entry in memory 233 at the network manager 229, ensuring integrity of the enrollment definition for the mobile wireless device 242. The particular mobile wireless device 242 operating as a gateway for the ad hoc network 240 forwards this data via the Earth station gateway 228 and satellite link 224, to the associated network manager 229. The mobile wireless device 242 operating as the ad hoc network 240 gateway flags the request as a proxy message tracking in a state condition the source mobile wireless device. The network manager 229 queries its database in memory 233 and responds with registration mailbox updates to the mobile wireless device 242 operating as the ad hoc network 240 gateway, which relays the data to the source mobile wireless device.

In normal operations, a mobile wireless device 242 as the sender executes a PTT group 254 function. If the ad hoc network 240, such as the MANET, is unavailable or unusable, the controller 250 via its network control agent 233 provides a "PTT fail" user feedback via a mobile wireless device interface. Under normal conditions, the controller 250 at the sender mobile wireless device 242 sends a multicast seamless PTT request message to the ad hoc network 240, in this example, a MANET. The servicing mobile wireless device 242 operating as an ad hoc network 240 gateway answers to the event unique, PTT request with a response "pending seamless PTT" message to identify to the talker and "Net" or PTT group 254 that it is proxying the PTT request to the network manager 229 and RTC 231 at the gateway 228. It then executes a virtual PTT over its network path, such as a DTCS path, to the network manager 229 and associated RTC 231 to request talker access to the PTT group 254.

A link level, gateway message, TMSI may operate as a proxy address for the mobile wireless device 242 operating as the ad hoc network 240 gateway, and a RTC 231 push-to-talk request message, TMSI, is the originating mobile wireless device address. Upon a "Net" i.e., PTT group 254 denial, the mobile wireless device 242 operating as a proxy responds to the sender over the ad hoc network 240 with a "seamless PTT deny," which is manifested from the network control agent 233 at the controller 250 via a user equipment application as a PTT deny feedback. When the network manager 229 and associated RTC 231 does permit the PTT grant for communication, it responds to the sender over the ad hoc network 240 with a "SPIT Grant," including information about the PTT group 254, sender, and session identifier. The sender mobile wireless device 242 provides the PTT feedback that the user is cleared to send.

Voice payloads may be processed by a respective mobile wireless device 242 as normal. Encrypted payloads may be redirected, in this case, via a network control agent 233 at the respective mobile wireless device 242 to an interface of the ad hoc network 240 instead of the mobile wireless device. It is possible that payload datagrams may be paired to populate Ethernet frames of about 60 bytes, and transmitted over the bat0 interface to the mobile wireless device 242 operating as the ad hoc network 240 gateway. The mobile wireless device 242 operating as that ad hoc network 240 gateway has its bat0 forward the stream of data to its controller 250 and associated network control agent 233, which transmits the data as PTT voice data for normal transmission to the network manager 229 and its associated RTC 231 at each station gateway 228.

Any mobile wireless device 242 operating as the ad hoc network 240 gateway that receives PTT traffic may broadcast "Net forward start" status messages, which includes the Net, e.g., PTT group 254, and unique session identifier, over the ad hoc network, e.g., a MANET. It will then multicast the PTT group 254 as the Net and push-to-talk payload traffic as paired datagrams over the ad hoc network 240, such as MANET Ethernet frames. Upon message completion, it will send a "Net forward stop" status message. Upon receipt of the "Net forward start" message from another mobile wireless device 242 operating as an ad hoc network 240 gateway, any other mobile wireless devices operating as ad hoc network gateways may suppress forwarding of the communication data DTCS to ensure that the ad hoc network propagates only one stream of the broadcast sessions, for example, DTCS broadcast sessions as part of satellite 240 communications. The mobile wireless device 242 operating as an ad hoc network 240 gateway in any other PTT group 254 may be independent of the sender or proxy mobile wireless device operating as a gateway of that other PTT group.

The network control agent 233 at a mobile wireless device 242 monitors any radio channel idle state, processes and forwards received multicast PTT session data for local processing if its detected PTT radio channel is idle or unavailable. This ensures that listener PTT traffic may be received, even if the satellite 224 link fails, and the mobile wireless device 242 will not provide duplicate output for a listener. This priority may be configured differently, as desired. All sender payload traffic may or may not also include sender position information appended to the voice data.

The data payloads for PTT groups 254 may be double-wrapped for data protection. For example, traffic data for a PTT group 254 may be encrypted with AES-256 encryption. Each PTT group 254 may have traffic encryption keys provided to its member mobile wireless devices 242 during the enrollment/registration process. The controller 250 and associated applications at a mobile wireless device 242 may provide end-to-end traffic encryption services with PTT group 254 keys for application payloads. An additional layer of intermediate path protection may be provided. For traffic forwarded over the satellite 224 link, the PTT group 254 data traffic is additionally AES encrypted with mobile wireless device specific mobile originated (MO) keys, such as encryption keys for satellite communications. For data traffic over an ad hoc network, e.g., a MANET or WiFi, PTT group 254 data traffic may include WPA2 encryption.

The network controller agent 233 associated with the controller 250 at each mobile wireless device 242 provides other capabilities and services, such as virtualized multi-channel reception (VMCR). Even though each mobile wireless device 242 may transmit on a single PTT group 254 at any time, and receive data and messages from multiple PTT groups, it may be preferable in some cases for the Earth station gateway 228 and its associated network manager 229 and RTC 231 to maintain a mobile wireless device in passive or non-operating mode. Using VMCR capability, a mobile wireless device 242 operating on the ad hoc network 240, for example, may share its mobile wireless device and allow simultaneous PTT reception for multiple PTT groups 254.

Each member mobile wireless device of a PTT group 254 is polled at initialization of the ad hoc network 240 and broadcasts PTT availability, i.e., the PTT group to which it is provisioned for. A mobile wireless device 242 is either designated by configuration or pseudo-randomly designated by negotiation algorithm, e.g., computed score of device attributes such as value of MAC address, etc. as a primary mobile wireless device. This primary mobile wireless device 242 via its controller 250 and its network control agent 233 assigns channel monitoring responsibility to other mobile wireless devices 242 operating on the ad hoc network 240 as a specific PTT group 254. Each designated mobile wireless device 242 operating as an ad hoc network 240 gateway will then forward its assigned PTT group 254 traffic as multicast messages over the ad hoc network, e.g., the MANET.

Additionally, a mobile wireless device 242 via its controller 250 and associated network control agent 233 may perform "cache-in-conflict" functionality. If a user operating a mobile wireless device 242 is active in the primary PTT group 254 channel, and traffic is received on any of its secondary PTT group channels, either directly over the satellites or relayed via the ad hoc network 240 and an associated peer mobile wireless device, the mobile wireless device of that user may buffer the session payload and provide an indicator to the user of the "voicemail" message with origin and timestamp. The user at the mobile wireless device 242 can then replay the cached transmission.

As noted before, it is possible for virtual devices 243, such as a virtual wireless device (FIG. 4), to operate with the satellite communications network 220. The combination of user equipment applications and controller 250 and network control agent 233 functionality of a mobile wireless device 242 having a satellite transceiver 246 may be instantiated as standalone functionality in a hardware platform that may not be satellite radio capable, such as an android or similar phone. When implemented, a third party without a satellite capable transceiver 246 can participate in a beyond line-of-sight, PTT group 254 and associated ad hoc network 240 communications by proxy. Using an application on a WiFi capable device, the user can join the ad hoc network 240, e.g., MANET, or other IP local area network and originate and receive traffic from other PTT group 254 participants, as long as the non-satellite enabled virtual device 243 is registered and provisioned as a virtual device with the network manager 229 at the gateway 228.

The same virtual device 243 may operate in what is termed a "ghost mode." The virtual device 243 may operate as a passive, receive-only recipient to the network manager 229 "ghost mode," i.e., the device is unknown to the network manager. The decrypted stream from a servicing mobile wireless device 242 operating as an ad hoc network gateway decrypts the PTT group 254 encrypted payload data and forwards it over WiFi or other ad hoc network 240, e.g., MANET. The controller 250 and its associated network control agent 233 at the mobile wireless device 242 may be configured to bridge the WiFi or other ad hoc network node as an access point simultaneously, thus providing an IP data path for forwarding encapsulated data to external IP endpoints.

This functionality as described above is aided by the associated network control agent 233 for a mobile wireless device 242 that monitors for satellite access, and fails over automatically to an alternate ad hoc network 240 path when primary access fails. A mobile wireless device 242 may establish a point-to-point connection with a peer serving as a servicing, ad hoc network 240 gateway via a protocol that optimizes and avoids duplication. This protocol may handle access and flow control transparently with the gateway 228 and ad hoc network 240, requiring no change to that ad hoc network or satellite communication system 220. A network control agent 233 associated with a controller 250 on another second mobile wireless device 242 may detect its role as an ad hoc network 240 gateway and automatically negotiate its connection with the sender or receiver WiFi ad hoc network or peer.

The network control agent 233 functionality may be virtually instantiated on a radio device as a virtual device 243 that has no satellite transceiver 246, such as an android phone, or as an application networked as a peer to a mobile wireless device 242 operating as a gateway for the ad hoc network 240. A network control agent 233 functionality may operate as a payload source for third party applications and devices.

It is also possible to provide what appears to a user to be seamless, WiFi and satellite, push-to-talk connectivity using an IP bridged gateway 228 and the associated network manager 229 and RTC 231. A voice data channel operational relay at the gateway 228 and data center such as at the RTC 231 or similar server handling the underlying voice/data protocol, may operate as a Netted Service Traffic Manager (NSTM) module, which provides the data "reflection" from a talker/sender, voice/data communication source received over a PTT group 254 to peer member receivers. It may maintain a list of PTT group 254 peers provided by the network manager 229 and their associated location/servicing satellites 224 so that it can rebroadcast source talker input out to the proper end devices via the servicing satellites and the gateway 228.

The network manager 229 may connect to this NSTM module via an IP link. The network manager 229 associates the PTT group 254 members by their satellite system identifiers, e.g., one of several options: IMEI, VEI, TMSI, to the various PTT group members, irrespective of the communication medium, e.g., satellite link or IP. The ID also provides a function for link layer source and destination addressing over the satellite communications system 220, such as the constellation of satellites 224. The network manager 229 maintains device and registration information for the different PTT groups 254 in its database within memory 233.

The network manager 229 and its associated NSTM module also have the ability to identify and interact with IP based PTT group 254 participants identified by their Virtual Equipment Identifier (VEI), having similar functionally as the equivalent of the satellite system identifier and may uniquely identify an IP endpoint for the network as DTCS or the TMSI.

The mobile wireless devices 242 may be configured to operate in a manner that uses their WiFi or integrated Ethernet interface as an Internet 238 connection. This may be established via built-in mesh capability that is configured to route to a peer or access point and provide Internet access via a standard TCP/IP or WiFi configuration presented to a service provider for Internet access.

A mobile wireless device 242 may be configured as an automated satellite, failover mechanism, and the mobile wireless device 242 may terminate the broadcasts to and from the NSTM associated with a network manager 229 over its IP link. When IP connectivity is established, the mobile wireless device 242 registers to the network manager 229 over a secure IP link, authenticates using an X.509 certificate or other unique authentication token, and receives provisioning information for its constituent PTT group 254 and security keys. From that point on, its PTT group 254 routing configuration at the controller 250 sends and receives access control data and payload data over IP to the NSTM module using a secure encrypted IP link. The NSTM module acts as a trunk for the various PTT group 254 peers that communicate. When reflecting to and from the satellite communication peers and IP peers, it will translate the enveloped, commonly encrypted payload segments into the respective network and link layer protocols and prepends the correct destination address for peer reflection.

The network manager 229 and NSTM module addressing scheme allows interoperable addressing of native DTCS and IP clients. NSTM translation allows the TCP/IP or UDP/IP segmented data payloads to operate as an enhanced short burst data (SBD) and operate with a radio link protocol. This IP based provisioning scheme may enroll an internet client into a satellite network having the PTT groups 254 such as within a DTCS network as an overlay to the satellite system. A common network encryption scheme may work for consistent and interoperable payload sharing over disparate media.

This application is related to copending patent applications entitled, "COMMUNICATIONS SYSTEM HAVING MOBILE WIRELESS DEVICES THAT COMMUNICATE VIA SATELLITE OR WIFI AND ASSOCIATED METHODS," which is filed on the same date and by the same assignee and inventors, the disclosure which is hereby incorporated by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. A satellite communication system comprising:
   a constellation of cross-linked orbiting satellites;
   a network manager cooperating with the constellation of cross-linked orbiting satellites and configured to maintain a database of push-to-talk (PTT) groups, each PTT group comprising a plurality of mobile wireless devices;
   each mobile wireless device comprising
      a satellite transceiver,
      a WiFi transceiver, and
      a controller configured to
         communicate with other members of a respective PTT group via the satellite transceiver when a satellite link is available,
         determine at least one ad hoc network link with an adjacent mobile wireless device using the WiFi transceiver, and
         communicate with the other members of the respective PTT group via the at least one ad hoc network link when the satellite link is not available; and
   a virtual wireless mobile device having a WiFi transceiver and no satellite transceiver, said network manager configured to
      a) provision the virtual wireless mobile device with PTT configurations,
      b) enroll said virtual wireless mobile device within the respective PTT group of mobile wireless devices that have no available satellite link and are operating in the ad-hoc network without a communications link to the network manager, and
      c) operate the virtual wireless mobile device in a passive receive-only mode using the WiFi transceiver to relay communications traffic to the network manager from the other mobile wireless devices within the PTT group,
      wherein said network manager is triggered to provision the virtual wireless mobile device when the network manager loses a communications link to the mobile wireless devices within the PTT group.

2. The satellite communication system of claim 1 wherein the virtual device is configured to communicate via the Internet.

3. The satellite communication system of claim 1 wherein the network manager is configured to pass transmissions therethrough for each PTT group member.

4. The satellite communication system of claim 3 wherein the network manager is configured to store for playback at least some of the transmissions.

5. The satellite communication system of claim 1 wherein the constellation of cross-linked orbiting satellites comprises a plurality of Iridium satellites.

6. The satellite communication system of claim 1 wherein at least some of the mobile wireless devices comprise a hand-held housing carrying the satellite transceiver, WiFi transceiver and controller.

7. The satellite communication system of claim 1 wherein at least some of the mobile wireless communications devices comprise a vehicle-mount housing carrying the satellite transceiver, WiFi transceiver and controller.

8. A network manager for cooperating with the constellation of cross-linked orbiting satellites and configured to maintain a database of push-to-talk (PTT) groups and a plurality of mobile wireless devices, each mobile wireless device comprising a satellite transceiver, a WiFi transceiver, and a controller configured to communicate with other members of a respective push-to-talk (PTT) group via the satellite transceiver when a satellite link is available, determine at least one ad hoc network link with an adjacent mobile wireless device using the WiFi transceiver, and communicate with the other members of the respective PTT group via the at least one ad hoc network link when the satellite link is not available, the network manager comprising:
- a processor and associated memory, the processor configured to
  - a) maintain a database of (PTT) groups,
  - b) provision a virtual wireless mobile device having a WiFi transceiver and no satellite transceiver with PTT configurations,
  - c) enroll said virtual wireless mobile device within the respective PTT group of mobile wireless devices that have no available satellite link and are operating in the ad-hoc network without a communications link to the network manager, and
  - d) operate the virtual wireless mobile device in a passive receive-only mode using the WiFi transceiver to relay communications traffic to the network manager from the other mobile wireless devices within the PTT group,
  - wherein said network manager is triggered to provision the virtual wireless mobile device when the network manager loses the communications link to the mobile wireless devices within the PTT group.

9. The network manager of claim 8 wherein the virtual device is configured to communicate via the Internet.

10. The network manager of claim 8 wherein the processor is configured to pass transmissions therethrough for each PTT group member.

11. The network manager of claim 10 wherein the processor is configured to store for playback at least some of the transmissions.

12. A mobile wireless device for a satellite communication system comprising a network manager cooperating with a constellation of cross-linked orbiting satellites, with the network manager configured to a) maintain a database of push-to-talk (PTT) groups, b) provision a virtual wireless mobile device having a WiFi transceiver and no satellite transceiver with PTT configurations, c) enroll the virtual wireless mobile device within a respective PTT group of mobile wireless devices that have no available satellite link and are operating in the ad-hoc network without a communications link to the network manager, and d) operate the virtual wireless mobile device in a passive receive-only mode using the WiFi transceiver to relay communications traffic to the network manager from the other mobile wireless devices within the PTT group, wherein the network manager is triggered to provision the virtual wireless mobile device when the network manager loses the communications link to the mobile wireless devices within the PTT group, the mobile wireless device comprising:
- a satellite transceiver;
- a WiFi transceiver; and
- a controller configured to
  - communicate with other members of a respective PTT group via the satellite transceiver when a satellite link is available,
  - determine at least one ad hoc network link with an adjacent mobile wireless device using the WiFi transceiver, and
  - communicate with the other members of the respective PTT group via the at least one ad hoc network link when the satellite link is not available.

13. The mobile wireless device of claim 12 comprising a portable housing carrying the satellite transceiver, WiFi transceiver and controller.

14. The mobile wireless device of claim 13 wherein the portable housing comprises a hand-held housing.

15. The mobile wireless device of claim 13 wherein the portable housing comprises a vehicle-mount housing.

16. The mobile wireless device of claim 12 comprising a satellite antenna coupled to the satellite transceiver and a WiFi antenna coupled to the WiFi transceiver.

17. A method of operating a mobile wireless device with a satellite communication system comprising a constellation of cross-linked orbiting satellites, and a network manager cooperating with the constellation of cross-linked orbiting satellites and configured to a) maintain a database of push-to-talk (PTT) groups, b) provision a virtual wireless mobile device with PTT configurations, c) enroll the virtual wireless mobile device within a respective PTT group of mobile wireless devices that have no available satellite link and are operating in the ad-hoc network without a communications link to the network manager, and d) operate the virtual wireless mobile device in a passive receive-only mode using the WiFi transceiver to relay communications traffic to the network manager from the other mobile wireless devices within the PTT group, wherein the network manager is triggered to provision the virtual wireless mobile device when the network manager loses the communications link to the mobile wireless devices within the PTT group, the method comprising:
- operating a controller of the mobile wireless device to
  - communicate with other members of a respective PTT group via a satellite transceiver of the mobile wireless device when a satellite link is available,
  - determine at least one ad hoc network link with an adjacent mobile wireless device using a WiFi transceiver of the mobile wireless device, and
  - communicate with the other members of the respective PTT group via the at least one ad hoc network link when the satellite link is not available.

18. The method of claim 17 comprising operating the virtual device to communicate via the Internet.

19. The method of claim 17 comprising operating the network manager to pass transmissions therethrough for each PTT group member.

20. The method of claim 19 comprising operating the network manager to store for playback at least some of the transmissions.

21. The method of claim 17 wherein the constellation of cross-linked orbiting satellites comprises a plurality of Iridium satellites.

22. The method of claim 17 wherein at least some of the mobile wireless devices comprise a hand-held housing carrying the satellite transceiver, WiFi transceiver and controller.

23. The method of claim 17 wherein at least some of the mobile wireless communications devices comprise a vehicle-mount housing carrying the satellite transceiver, WiFi transceiver and controller.

* * * * *